(12) United States Patent
Schlarb et al.

(10) Patent No.: US 9,244,697 B2
(45) Date of Patent: Jan. 26, 2016

(54) STABLE ANCHORS IN USER INTERFACE TO SUPPORT LIFE CYCLE EXTENSIONS

(75) Inventors: Uwe Schlarb, Ostringen (DE); Ioannis Grammatikakis, Maxdorf (DE); Gregor Karl Frey, Lorsch (DE); Matthias Lehr, Weinheim a.d.B. (DE); Markus Viol, Walldorf (DE); Stefan A. Baeuerle, Rauenberg (DE); Bernhard Thimmel, Edingen-Neckarhausen (DE); Karsten Fanghanel, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 12/847,311

(22) Filed: Jul. 30, 2010

(65) Prior Publication Data

US 2012/0030580 A1    Feb. 2, 2012

(51) Int. Cl.
*G06F 3/01*  (2006.01)
*G06F 9/44*  (2006.01)
*G06F 3/00*  (2006.01)

(52) U.S. Cl.
CPC .................................... *G06F 9/4443* (2013.01)

(58) Field of Classification Search
CPC ...... G06F 21/31; G06F 3/0481; G06F 9/4443
USPC .......... 715/741, 747; 717/109, 108, 110, 113, 717/125, 128, 105, 106, 137
See application file for complete search history.

(56) References Cited

U.S. PATENT DOCUMENTS

| | | | |
|---|---|---|---|
| 5,680,619 A * | 10/1997 | Gudmundson et al. ....... | 717/108 |
| 5,883,623 A * | 3/1999 | Cseri ............................. | 715/866 |
| 5,933,142 A * | 8/1999 | LaStrange et al. ............ | 715/788 |
| 6,094,654 A * | 7/2000 | Van Huben et al. | |
| 6,871,348 B1 * | 3/2005 | Cooper .......................... | 719/310 |
| 6,971,018 B1 * | 11/2005 | Witt et al. ..................... | 713/187 |
| 7,484,182 B1 * | 1/2009 | Smith ........................... | 715/794 |
| 2002/0002606 A1 * | 1/2002 | Jaffe ............................. | 709/223 |
| 2004/0088324 A1 * | 5/2004 | Khan et al. .................. | 707/104.1 |
| 2006/0026525 A1 * | 2/2006 | Fischer et al. ............... | 715/741 |
| 2006/0053380 A1 * | 3/2006 | Spataro et al. .............. | 715/753 |
| 2006/0179028 A1 * | 8/2006 | Bram et al. ..................... | 706/47 |
| 2006/0218028 A1 * | 9/2006 | Kelly et al. ....................... | 705/8 |
| 2006/0218500 A1 * | 9/2006 | Sauve et al. .................. | 715/767 |
| 2007/0261026 A1 * | 11/2007 | Berger et al. ................. | 717/109 |
| 2007/0276811 A1 * | 11/2007 | Rosen ................................ | 707/3 |
| 2009/0006996 A1 * | 1/2009 | Saha et al. .................... | 715/765 |
| 2009/0199133 A1 * | 8/2009 | Deutsch et al. .............. | 715/811 |
| 2010/0005381 A1 * | 1/2010 | Safars et al. .................. | 715/205 |
| 2010/0114967 A1 * | 5/2010 | Yaniv et al. .................. | 707/785 |
| 2010/0306644 A1 * | 12/2010 | Underwood et al. ......... | 715/234 |
| 2012/0233569 A1 * | 9/2012 | Bhatt et al. .................... | 715/810 |
| 2013/0339867 A1 * | 12/2013 | Kembel et al. ............... | 715/738 |
| 2014/0195309 A1 * | 7/2014 | Kumhyr et al. .............. | 705/7.37 |

\* cited by examiner

*Primary Examiner* — Amy Ng
*Assistant Examiner* — Toan Vu
(74) *Attorney, Agent, or Firm* — Buckley, Maschoff & Talwalkar LLC (57) ABSTRACT

According to some embodiments, a business service provider may define a stable user interface anchor entity associated with a business object data structure. A reference field may be associated with the stable user interface anchor, the reference field representing a path to a persistent node of the business object data structure. An end user adaptation to a user interface may then be applied in connection with the business object data structure, the adaptation referencing the stable user interface anchor entity.

19 Claims, 12 Drawing Sheets

STABLE ANCHORS IN USER INTERFACE TO SUPPORT LIFE CYCLE EXTENSIONS

FIELD

Some embodiments relate to a service-oriented architecture associated with business objects. More specifically, some embodiments provide stable anchors in a user interface to support life cycle extensions in connection with a service-oriented architecture.

BACKGROUND

An enterprise might store and access business information in a number of different ways. For example, an enterprise might store a substantial amount of information about production, sales, human resources, etc. in one or more database structures created by a business service provider (e.g., SAP AG® or SalesForce®). The enterprise might also generate various views of that information as needed (e.g., to create financial reports). In some cases, the enterprise might use pre-defined user interfaces to interact with the database structures. Often, however, an enterprise will want to customize these user interfaces, or even create entirely new user interfaces, based on the business needs of the enterprise. For example, an enterprise might change a sales order user interface by adding a "Sub Product Identifier" next to an existing "Product Identifier."

Note that a business service provider may periodically make changes to the database structures. For example, the business service provider might release system wide patches or new versions of various database structures to improve the efficiency of the system or to add new features. Unfortunately, these changes to the database structures might conflict with previous customizations made by an enterprise. For example, if business service provider has moved the location of the "Sub Product Identifier" and/or or changed the name of the element in the database structure, previous customizations made by an enterprise in connection with that element may become inoperative. Correcting such problems can be a time-consuming and expensive project, especially when substantial amounts of data elements and/or customizations are involved.

Accordingly, a method and mechanism for efficiently allowing customizations to a user interface that will not be disturbed by system-wide updates may be provided by some embodiments herein.

DETAILED DESCRIPTION

Figure 1:
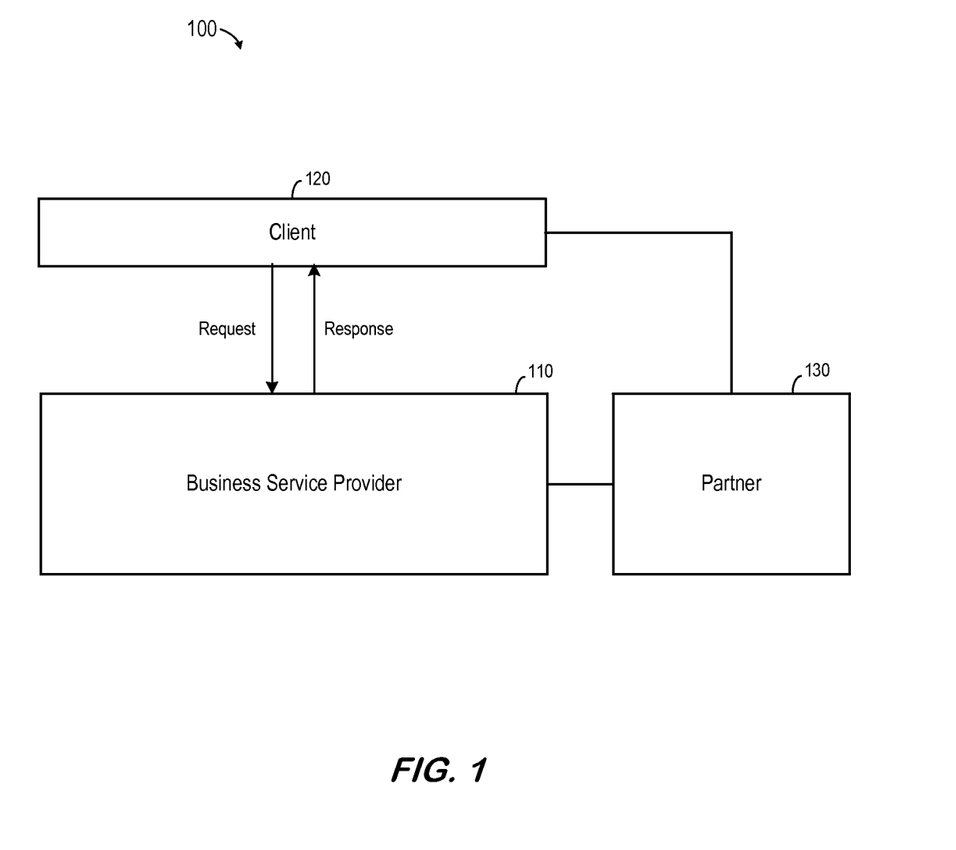
FIG. 1 is a block diagram of a system according to some embodiments.

An enterprise might store and access business information in a number of different ways. For example, an enterprise might store a substantial amount of information about production, sales, human resources, etc. in one or more database structures created by a business service provider (e.g., SAP AG® or SalesForce®). FIG. 1 is a block diagram of a system 100 according to some embodiments. In this case, a business service provider 110 might host and provide business services for a client 120. For example, the business service provider 110 might receive requests from the client 120 and provide responses to the client 120 via a service-oriented architecture such as those provided by SAP Business ByDesign® or Salesforce®. The use of the remotely hosted business process platform may help the client 120 avoid the costs and problems associated with maintaining a local, "in house" Enterprise Resource Planning (ERP) system.

The client 120 may be associated with a Web browser to access services provided by business process platform 110 via HyperText Transport Protocol (HTTP) communication. For example, a user may manipulate a user interface of the client 120 to input an instruction (e.g., "show me a sales report"). The client 120, in response, may transmit a corresponding HTTP service request to the business service provider 110 as illustrated. A service-oriented architecture may conduct any processing required by the request (e.g., generating views and user interfaces) and, after completing the processing, provides a response to client 120. The client 120 might comprise a Personal Computer (PC) or mobile device executing a Web client. Examples of a Web client include, but are not limited to, a Web browser, an execution engine (e.g., JAVA, Flash, Silverlight) to execute associated code in a Web browser, and/or a dedicated standalone application.

Note that FIG. 1 represents a logical architecture for describing processes according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

The business service provider 110 might store client information into and retrieve client information from one or more database structures, such one or more "business objects." As used herein, the phrase "business object" may refer to a set of entities with common characteristics and common behavior representing a defined business semantic. Note that business data may be stored within physical tables of a database. The database may comprise a relational database such as SAP MaxDB, Oracle, Microsoft SQL Server, IBM DB2, Teradata and the like. Alternatively, the database could be a multi-dimensional database, an eXtendable Markup Language (XML) document, or any other structured data storage system. The physical tables may be distributed among several relational databases, dimensional databases, and/or other data sources.

The structures of and relationships between the physical database tables may be complex, and business objects may be used to shield developers and end-users from these complexities. A business object may comprise, for example, a software model including nodes to encapsulate related data and methods. Moreover, a business object may be associated with a business entity, such as a customer, partner, sales order, product, store, time, etc., represented in the data of a data source. Each instance of a business object may represent a particular instance of the entity represented by the business object. An instance of a sales order business object may, for example, provide a mapping to the underlying tables storing data associated with a particular sales order.

In general terms, the business object model defines business-related concepts for a number of business transactions. The business object model may reflect the decisions and relationships about real world businesses acting in business transactions and may span across different industries and business areas. The business object model may be, for example, defined by business objects and their relationships to each other. Despite being applicable across different business entities and industries, business object model interfaces may be consistent across the different industries and across different business units because they are generated using a single business object model.

Figure 2:
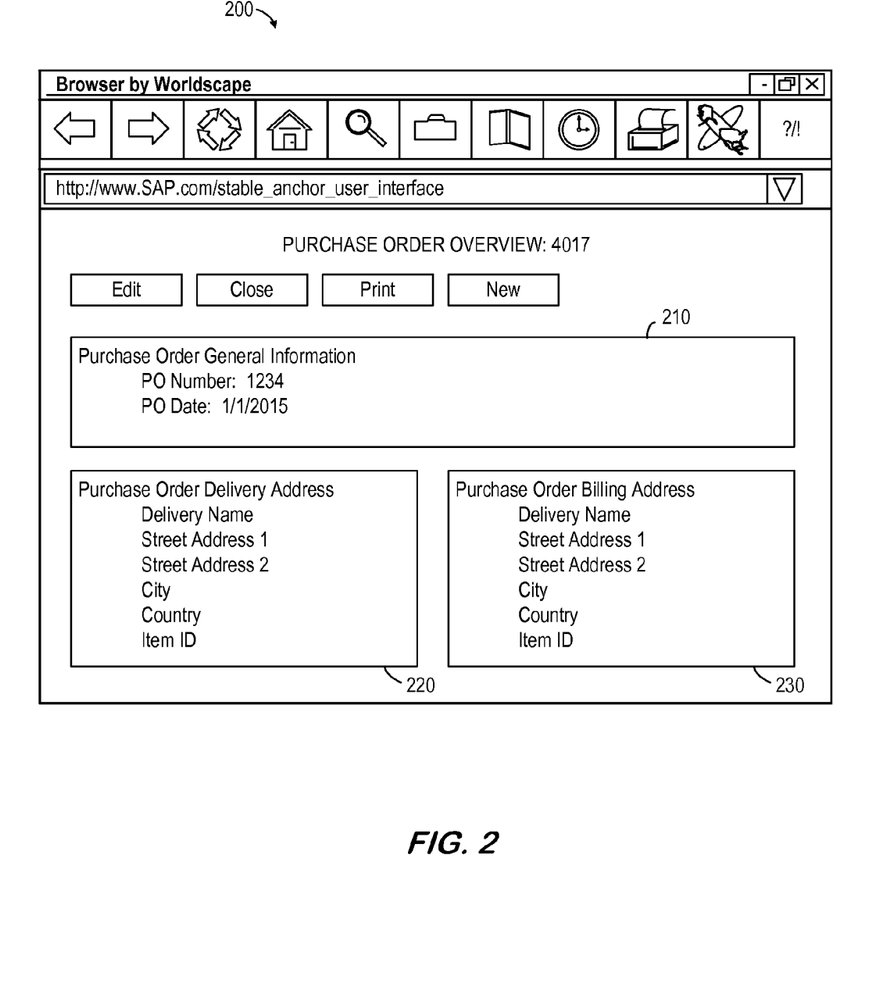
FIG. 2 is an example of a user interface.

The client 120 might use pre-defined user interfaces to interact with the database structures hosted by the business service provider 110. For example, FIG. 2 is an example of a purchase order user interface 200 including general information 210, a delivery address 220, and a billing address 230. In some cases, the client 120 may want to customize such a user interface 200. For example, the client 120 might want to add a telephone number to the delivery address 220. According to some embodiments, a partner 130 of a business service provider 110 may also create and/or customize user interfaces for clients 120.

Note that the business service provider 110 may periodically make changes to the database structures such as business objects. For example, the business service provider 110 might release system wide patches or new versions of business objects to improve the efficiency of the system or to add new features. Unfortunately, these changes to the business objects might conflict with previous customizations made by the client 120. For example, if business service provider 110 has moved the location and/or or changed the name of an element in a business object, previous customizations made by the client 120 in connection with that element may become inoperative. Correcting such problems can be a time-consuming and expensive project, especially when substantial amounts of data elements and/or customizations are involved.

Accordingly, a method and mechanism for efficiently allowing customizations to a user interface that will not be disturbed by system-wide updates may be provided by some embodiments herein.

Figure 3:
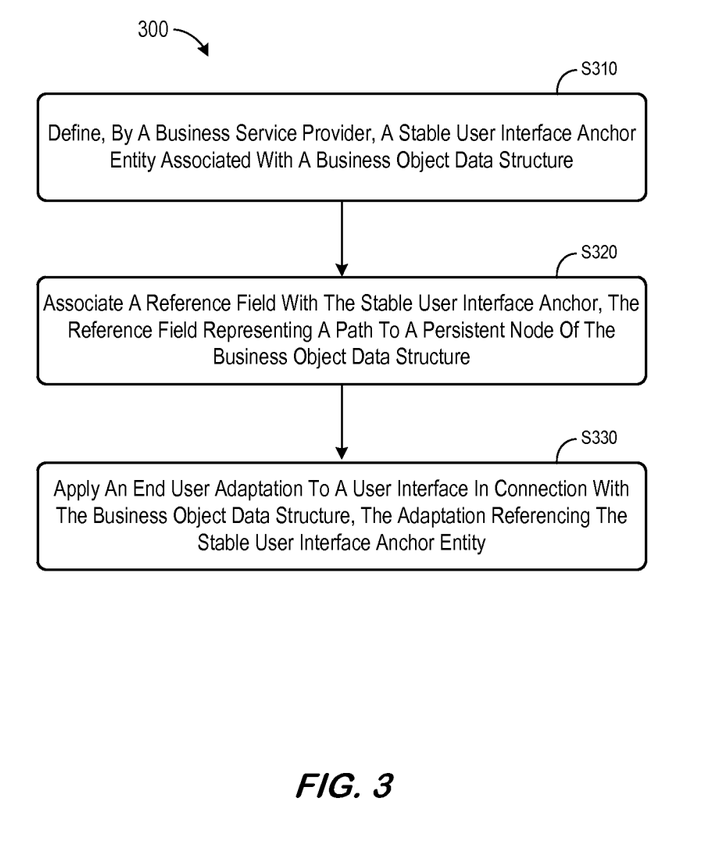
FIG. 3 is a flow diagram of a process according to some embodiments.

FIG. 3 is a flow diagram of a process 300 according to some embodiments. The business service provider 110 and/or client 120 may execute portions of the process 300 as will be described below, but embodiments are not limited thereto. In this regard, all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

Figure 4:
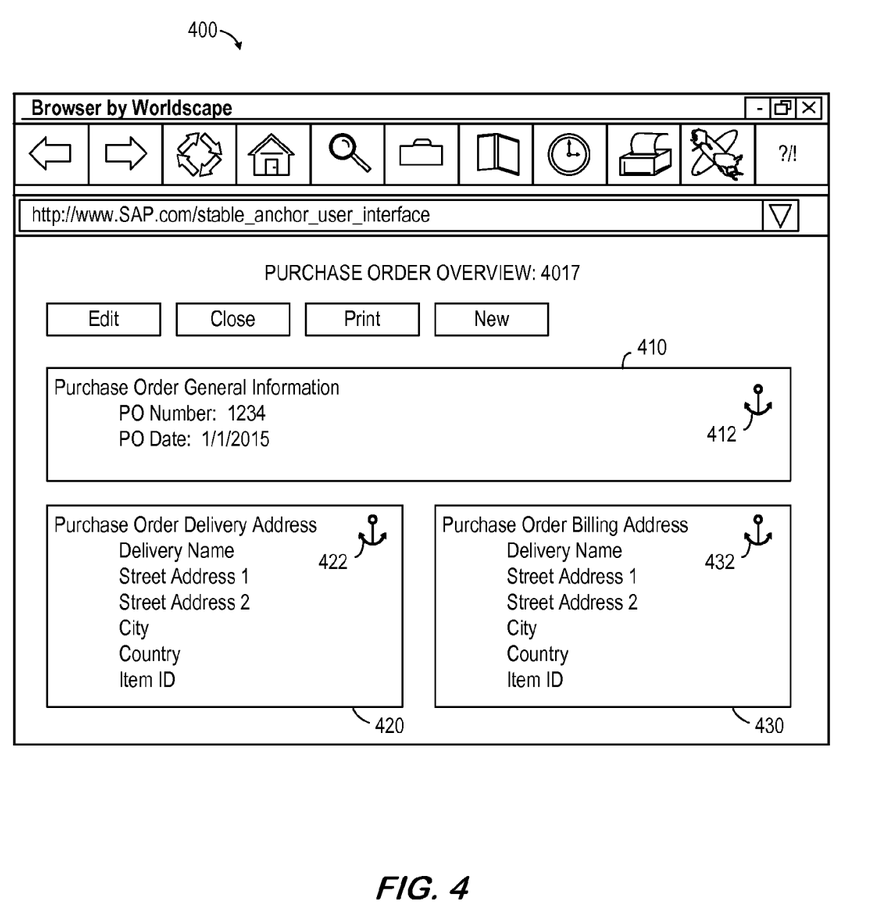
FIG. 4 is an example of a user interface in accordance with some embodiments described herein.

At S310, a business service provider defines a stable user interface "anchor" entity associated with a business object data structure. At S320, a reference field may be associated with the stable user interface anchor, the reference field representing a path to a persistent node of the business object data structure. For example, the business service provider 110 might designate a particular node as an "anchor" element and promise to not change that element in future software updates. Clients 120 and/or partners 130 might then use the anchor entity when customizing a user interface. For example, an end user adaptation may be applied to a user interface in connection with the business object data structure at S330, the adaptation referencing the stable user interface anchor entity. For example, FIG. 4 is an example of a user interface 400 in accordance with some embodiments described herein. In particular, the user interface 400 has a general anchor 412 associated with general purchase order information, a delivery address anchor 422 associated with a purchase order delivery address 420, and a billing address anchor 432 associated with a purchase order billing address 430. According to some embodiments, graphical indications of the stable user interface anchor entities are displayed on the user interface.

In this way, user interface adaptations done by clients and/or partners referencing those anchors 412, 422, 432 may survive a system-wide upgrade (e.g., support package), a new feature pack, or a major release. According to some embodiments, a minor repositioning of a change might be tolerated as long as it preserves the business semantic derived from the surrounding business context. For example, if a partner adds a custom field "distance" in a screen area labeled "supplier", after an upgrade the field distance will still be placed in the section "supplier" (and not in an area labeled "bill-to-party" or a generic area "lost-and-found" when the semantic of a field cannot be preserved). In this way, a client and/or partner may avoid reacting to new delivery of an ERP platform and may continue to drive their business undisturbed.

According to some embodiments, a stable user interface anchor entity may be associated with a persistent business object node and/or an extension field. Note, however, that anchors may be associated with other types of entities, such as a section group or list, a work center view, a work center, an outport associated with a mashup or navigation, a port type associated with a mashup or navigation, and/or a navigation operation.

According to some embodiments, user interfaces may be enriched during development with metadata that will help in a case of an upgrade to reconstruct the adaptations done by partners and clients (including "key users" who develop and test adaptations for clients). Moreover, changes occurring in connection with user interface development may consistently maintain also these metadata.

In some cases, the metadata might be associated with extension deltas attached to user interface entities (and avoid life-cycle issues during updates/upgrades), and the extensions might attach to explicitly defined extensions points that are stable anchors. These stable anchors may define the "contract" for the extension (e.g., the business service provider may promise or guarantee that all stable anchors released to customers will exist in follow-up releases). According to some embodiments, a stable anchor is defined by a system-wide unique identifier and a referenced entity.

According to some embodiment, an anchor may be associated with a "section group" or a "list" in a user interface. An extension field may then have a reference to a reference field and to a stable anchor on the user interface. The reference field will take care to recreate the field in the proper place in the business object, and the stable user interface anchor will take care that the field will be again positioned into the right section group or list in the user interface. The placement on the user interface may then happen relative to a stable anchor. Even if the exact placement of this field inside the correct section group is not guaranteed, it may be sufficient to have the field in the "correct" section group.

Every stable user interface anchor may have a unique name and a reference to a reference field. Note that a single section group in the user interface can be host for multiple anchors with different reference fields. This may be the case, for example, when the user interface developer has decided to put fields from different "business contexts" into one section group. In that case, the key user or partner might select the "business context" when trying to add an extension field to a section group. After the key user/partner selects the "business context" for adding an extension field, this field may be created with a reference to the anchor selected. This mechanism may help ensure that even when the developer decides to split the fields from different "business contexts" into separate section groups or even user interfaces, the extension fields will follow the anchor that was selected during creation.

According to some embodiments, an extension field added by a client may survive may different types of changes, including: moving a section group to another position (e.g., a tab, a view, or a sub-view) of the same user interface; displaying data in a list instead of a form (or in a form instead of a list); section group merges; moving a section group to another user interface; splitting a section group into multiple section groups; splitting a user interface into multiple user interfaces; and merging user interfaces.

Once the reference fields are created, the initial set of stable user interface anchors might be created via an automatic generation. For each section group/list in a user interface component, all contained fields may be analyzed and a reference field is identified. For all identified reference fields in a section, a stable user interface anchor may be created.

According to some embodiments, a change may be received from a developer that alters an already released stable user interface anchor entity. In this case, the system might prevent the developer from making the change or at least providing an indication to the developer that the stable user interface will be changed. That is, after the initial set of user interface anchors is determined, the anchors may be constantly maintained by the application development teams. For example, an anchor that is delivered to customers should not be removed from the system. According to some embodiments, if a user interface (or section in a user interface) is deleted, all anchors from this user interface are preserved in a special area (e.g., a "lost and found" section for user interface anchors). These could then be simply reconstructed via a drag and drop to a new user interface section.

Figure 5:
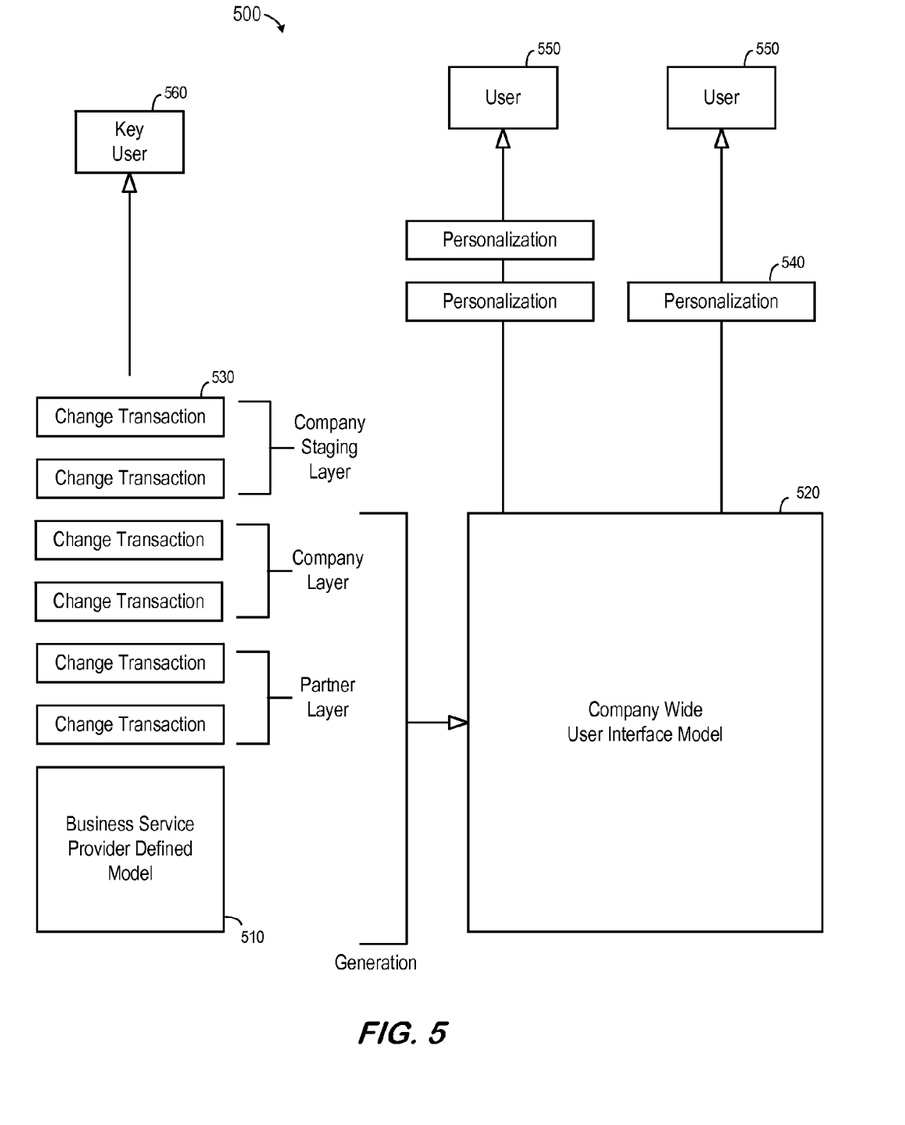
FIG. 5 is a block diagram of a user interface release architecture according to some embodiments.

To achieve stability during upgrades for partner and key user extensions, a user interface release architecture 500 as illustrated in FIG. 5 might be provided. In particular, a business service provider defined model might generate and provide a user interface to a client's company wide user interface model 520. The user interface might include one or more "change transactions" 530 associated with changes that do not alter anchor entities (e.g., changes made at a partner or company layer). The interface might be accessed by a user 550 after taking into account one or more user personalizations 540. "Test" change transactions 530 at a company staging layer might be accessible to a key user 560 but not to general users 550.

According to some embodiments, a repository might replace a generic (XML based) diff/merge mechanism with a mechanism of explicitly modeled "change records" that are applied to a user interface component by a plugin that knows how to deal with that specific kind of change. Furthermore, the tool that creates these changes (e.g., user interface runtime authoring or user interface designer) might store and access these changes explicitly in the repository. The repository might furthermore know which changes have to be applied to the base XML (and in which order) and call the right plugin to apply the changes after an upgrade/change in a system.

Furthermore, the repository may provide a mechanism to handle stable anchors and use these anchors as a reference for change records to make sure that it collects all the change records that have to be applied to a user interface component, even if stable anchors have moved to a new user interface component. Since these mechanisms might not run always at runtime, a load for a user interface component might be created with all changes applied for a client. To handle this efficiently, the key user adaptations 560 might be stored as a special list of change records 530 that can be applied directly on the client via the user interface runtime. The end user 550 personalization change records 540 may also be handled by the repository.

Figure 6:
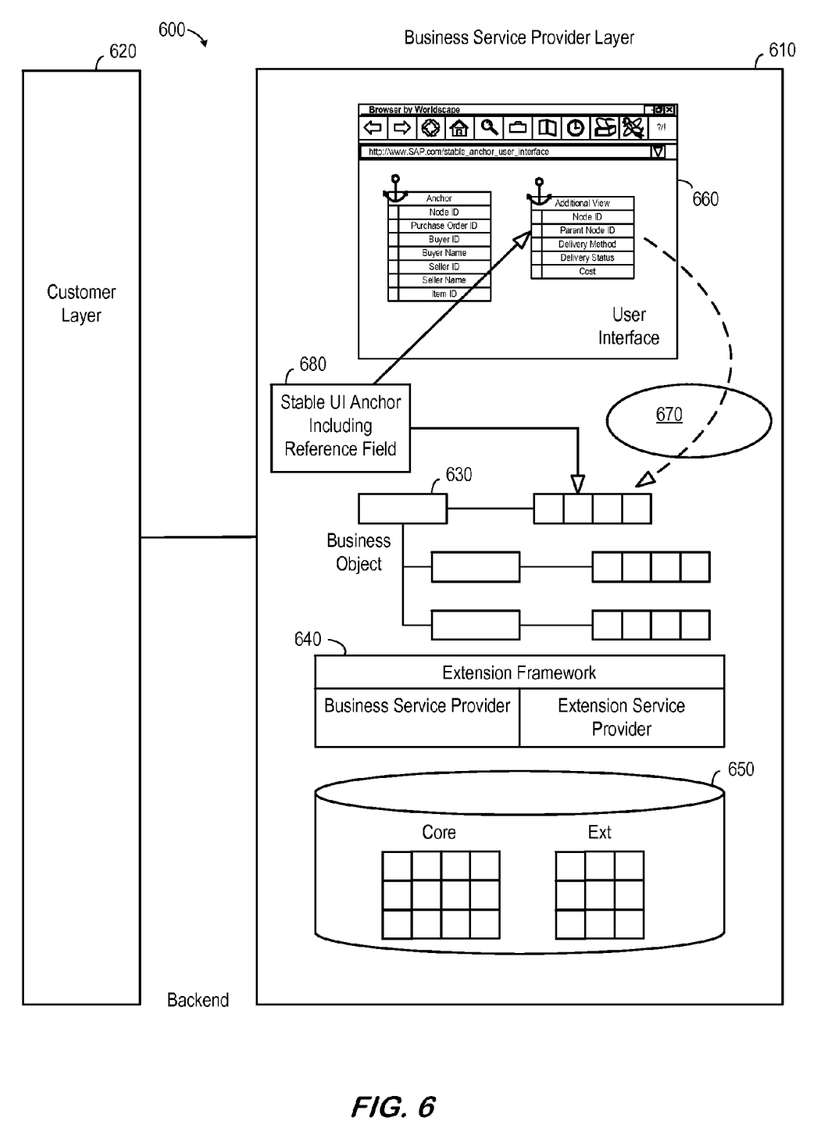
FIG. 6 is a block diagram of a system including a reference field for a stable user interface anchor according to some embodiments.

The handling of stable user interface anchors may be performed in a number of different ways. For example, FIG. 6 is a block diagram of a system 600 wherein a business services provider layer 610 (e.g., backend) interacts with a customer layer 620. The provider layer 610 includes a business object 630 and extension framework 640 between the business object 630 and core/extension information stored in a database 650. A user interface 660 may access the business object 630 via an access mechanism 670. The access mechanism 670 could be associated with, for example, (i) a Frontend Service Adaptation (FSA), (ii) a Controller Object (CO) implementation, (iii) a Business Service Architecture (BSA), (iv) an ABAP platform, (v) a Dynamic Dictionary (DDIC), (vi) manual coding, (vii) a Fast Search Infrastructure (FSA), (viii) a Transformed Object (TO), or (ix) a Transformation Node (TN).

According to this embodiment, the provider layer 610 further includes a stable user interface anchor with a reference field 680.

A stable user interface anchor might comprise, for example, a new entity with a new name representing a position in a user interface (e.g., a specific section) and a so-called reference field (which acts a representative for the path down to the persistent business object node). The new entity may have a name which is independent of a technical name of the user interface model. Thus, it may be kept stable, and this can be used as a stable anchor point. In other words: the new entity might be regarded as a part of the public model with respect to life cycle issues.

Figure 10:
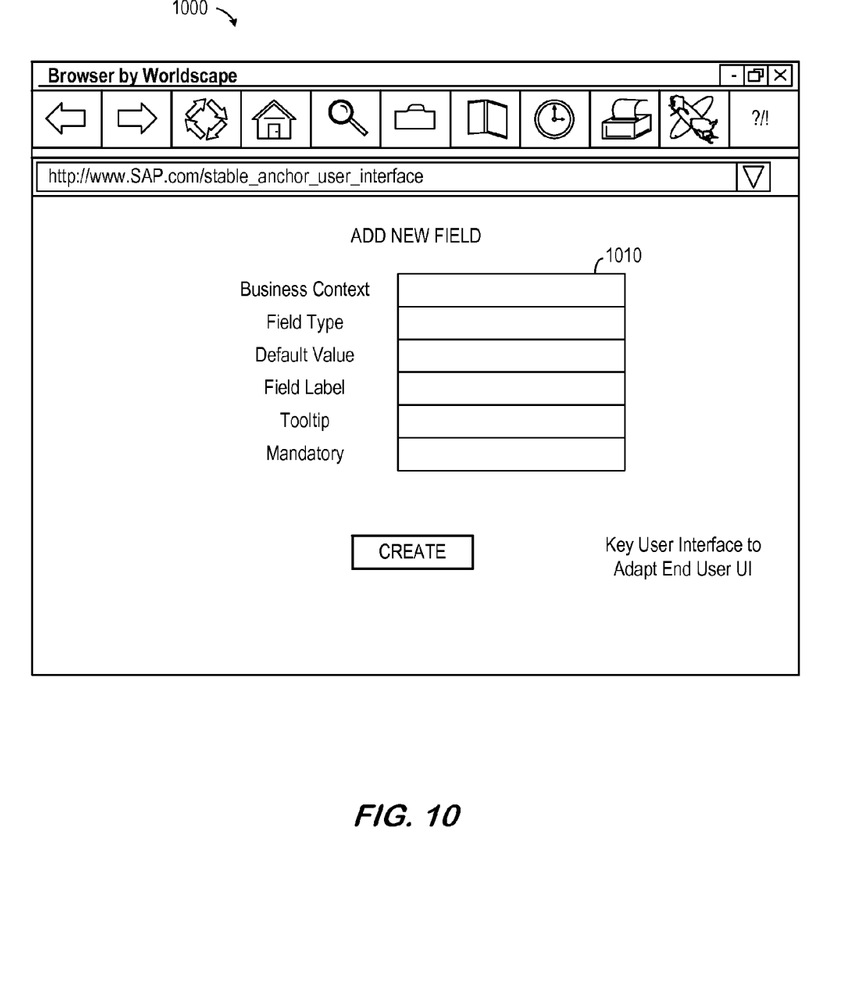
FIG. 10 is an example of a display that might be used to adapt a user interface according to some embodiments.

Note that only a small subset of all business object nodes might be a target of a reference field. Thus, the business object model may be substantially simplified ("Sales Order Header and Items") which is a prerequisite for a key user compatible tool (where the underlying business object node is derived from the reference fields available on the user interface). For example, a key user operating for a client might access a key user tool to add one or more extension fields to a user interface. Moreover, he or she might specify the field definition (type, label, code list, etc.) and the so-called "business context" (associated with the reference field) which is derived from the selected screen area via the stable user interface anchor located in this section. For example, a key user might perform an adaptation of an end user interface by selecting "adapt" in a menu. Besides pure layout adaptations, the key user might also add new fields. In this case, a dialog may occur to specify the details of the fields. FIG. 10 provides an example of a key user interface according to some embodiments.

Figure 7:
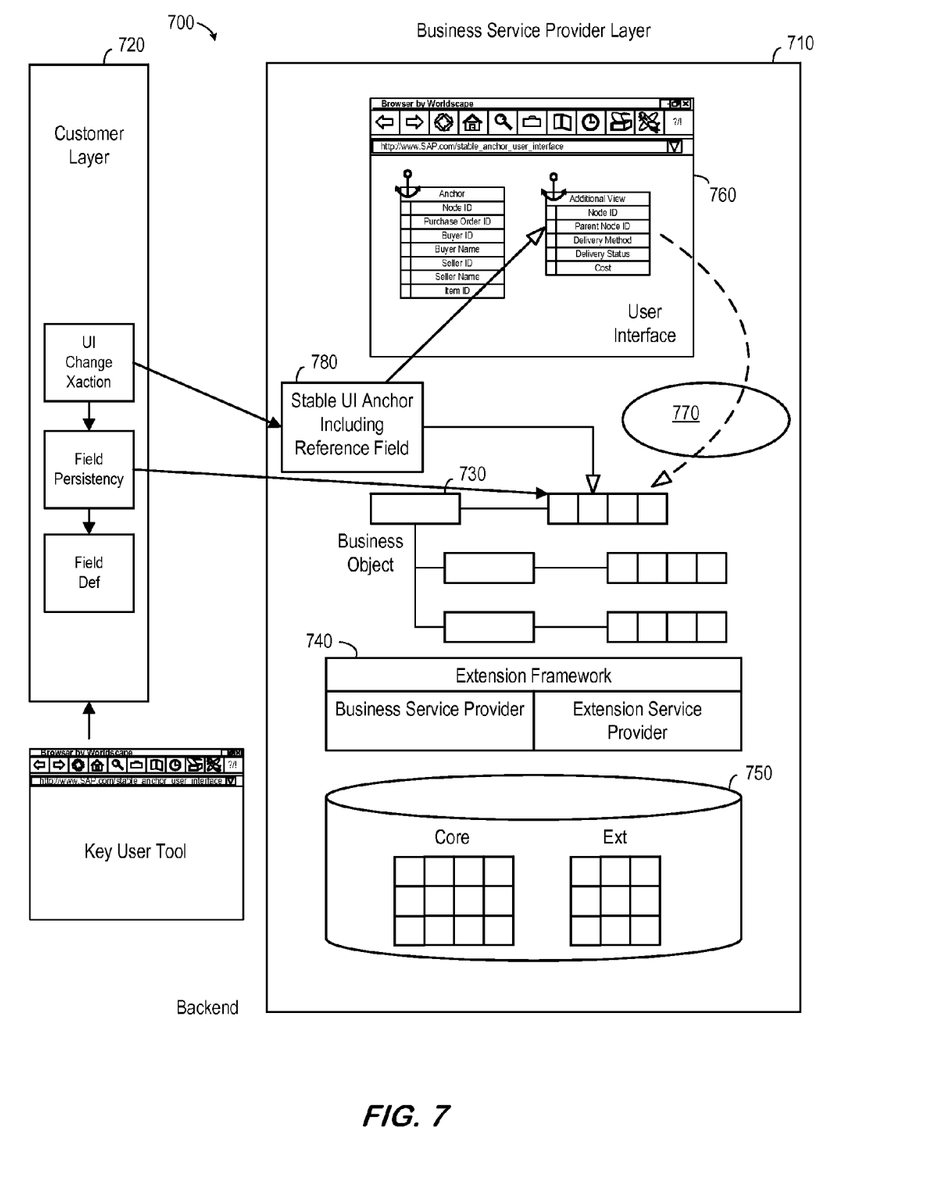
FIG. 7 is a block diagram of a system wherein a key user tool creates metadata describing a field extension according to some embodiments.

FIG. 7 is a block diagram of a system 700 wherein a business services provider layer 710 interacts with a customer layer 720. The provider layer 710 includes a business object 730 and extension framework 740 between the business object 730 and core/extension information stored in a database 750. A user interface 760 may access the business object 730 via an access mechanism 770 (e.g., a controller object). According to this embodiment, a key user tool at the customer layer 720 creates metadata describing the field extension. As a result, a user interface change transaction is generated. The change transaction may create a stable user interface and reference field 780 at the provider layer 710 and result in a field persistency and definition at the customer layer 720. For example, based on input from the key user tool, the following entities may be created: (1) a "field definition" containing type, label, code list, etc.; (2) a "field persistency" (contains the field definition and to which business object node it is logically attached); and (3) a "user interface change transaction" (describes that a field described in the "field persistency object" is to be added to a user interface in section specified by the user interface anchor and analogous to the reference field).

Figure 8:
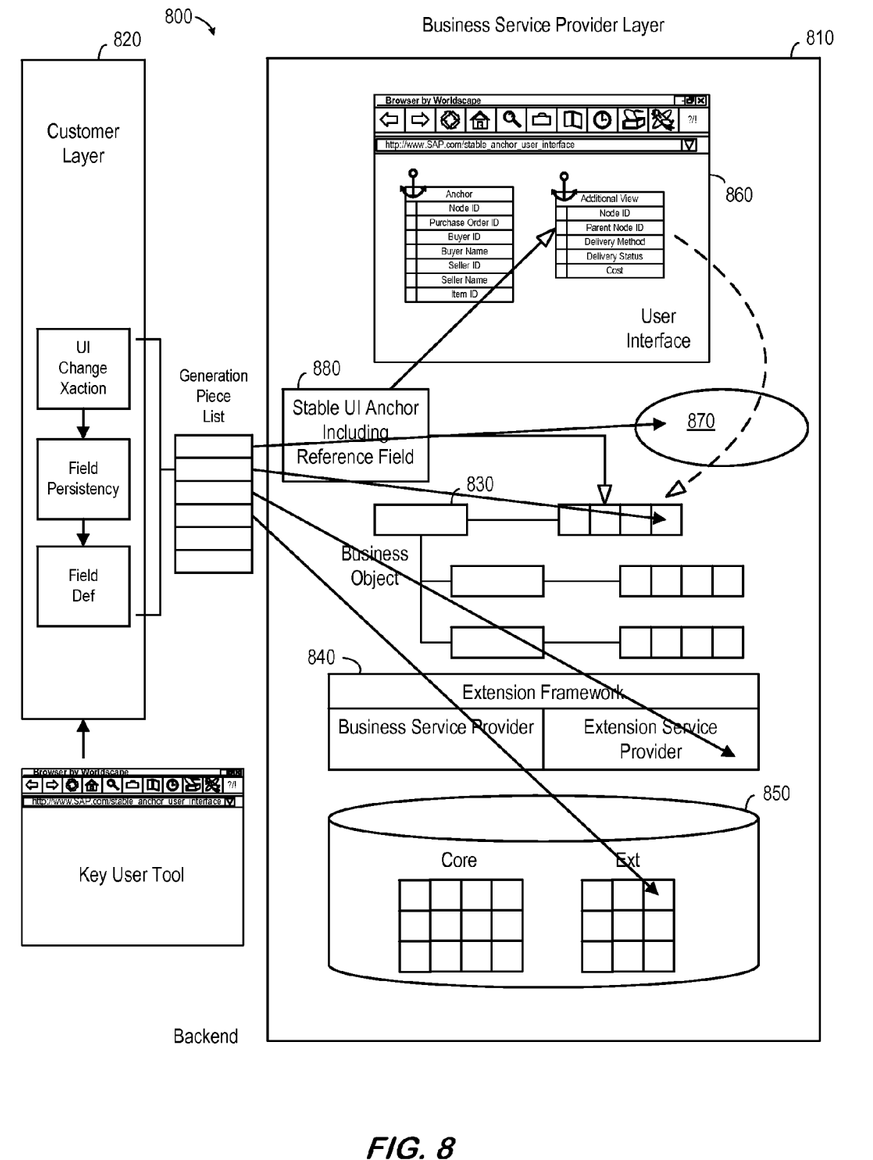
FIG. 8 is a block diagram of a system wherein runtime artifacts may be created by a field extensibility generator according to some embodiments.

According to some embodiments, when an extension field is activated, a field extensibility generator may create the necessary runtime artifacts. FIG. 8 is a block diagram of a system 800 wherein runtime artifacts (e.g., associated with a generation piece list) may be created by a field extensibility generator according to some embodiments. As before, a business services provider layer 810 interacts with a customer layer 820. The provider layer 810 includes a business object 830 and extension framework 840 between the business object 830 and core/extension information stored in a database 850. A user interface 860 may access the business object 830 via an access mechanism 870 (e.g., a controller object). According to this embodiment, a key user tool at the customer layer 820 creates metadata describing the field extension. As a result, a user interface change transaction is generated. The change transaction may create a stable user interface and reference field 880 at the provider layer 810 and result in a field persistency and definition at the customer layer 820.

Moreover, the metadata objects may be read along with the reference field definition, and, based on the physical field identified via the reference field, it is derived where a new field is to be added (e.g., to which controller node) and/or which runtime models must be extended (e.g., BSA model or FSI model).

According to some embodiments, the generated artifacts are only kept system locally (and only take effect tenant locally). They may be re-generated (created, changed, deleted) when the underlying objects are changed (e.g. via an import) or when a "tenant" is relocated (e.g., when a single provider layer supports many different customer layers 820).

Thus, embodiments described herein may provide a key user tool integrated into the user interface (because the business object model is simplified via the reference fields); multi-client enablement and client separation may be carried out for all relevant runtime machines and their extension metadata; ABAP/DDIC (dynamic boxed components) may be supported; client dependent generic persistency may be provided; and life cycle stability is achieved (since the metadata only couples the business object node and a reference field which are part of the public model, and the runtime artifacts are only generated system locally and are regenerated on demand). Note that the principle of the reference field as a life cycle stable abstraction of a path (along which fields are transported during runtime) might also be used for other areas of a business service architecture (e.g., inbound and outbound agents or direct business object-to-object communications).

According to some embodiments, stable user interface anchors and reference fields may be defined. This could be associated with, for example, an entity which is simply defined when creating a user interface. For example, the entity might point to a specific location on the user interface and point to a field in the data model of the user interface (as a representative for the path down to the persistent business object node). The entity might also point to the underlying, persistent business object.

Figure 9:
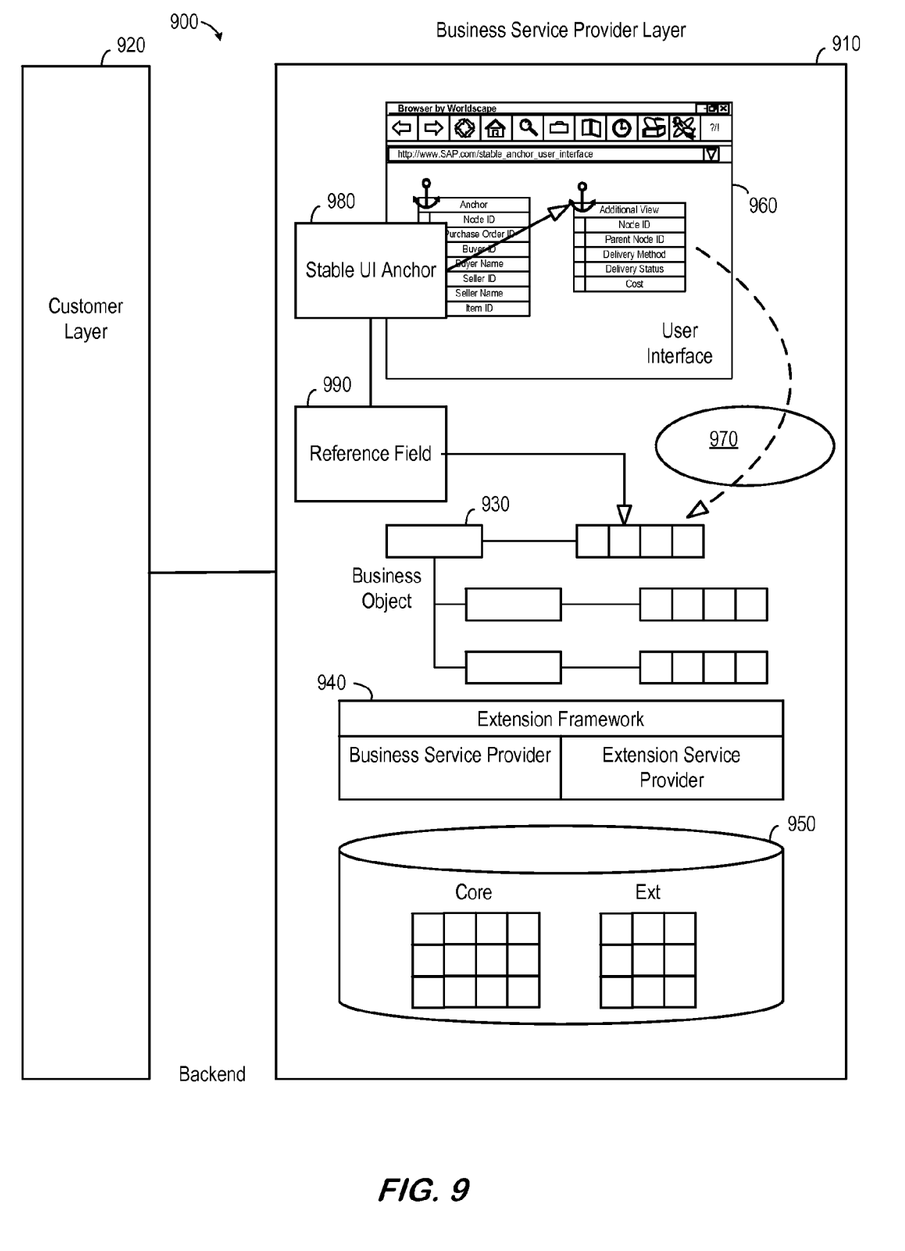
FIG. 9 is a block diagram of a system wherein multiple entities are provided in connection with a stable user interface anchor according to some embodiments.

According to another embodiment, a separate "reference field" entity may be provided in the Advanced Business Application Programming (ABAP) backend. For example, FIG. 9 is a block diagram of a system 900 wherein multiple entities are provided in connection with a stable user interface anchor according to some embodiments. As before, a business services provider layer 910 interacts with a customer layer 920. The provider layer 910 includes a business object 930 and extension framework 940 between the business object 930 and core/extension information stored in a database 950. A user interface 960 may access the business object 930 via an access mechanism 970.

According to this embodiment, the provider layer 910 further includes a stable user interface anchor 980 and separate reference field 990. In particular, the separate entity "reference field" 990 may be provided in the ABAP backend (e.g., in the MDRS there might be an entity "reference field bundle" containing the set of reference fields for a user interface). Moreover, each reference field may have its own, life cycle stable name and points to a field in the access mechanism 970 and to a persistent business object node of the business object 930. The stable user interface anchor may, according to some embodiments, point to a specific location on the user interface, point to a field in the data model of the user interface (as a representative for the path down to the persistent business object node), and point a reference field in the ABAP Backend (and not to a persistent business object node).

Once stable anchors are defined for a user interface, a client may references those anchors when adding a new extension to an existing user interface. FIG. 10 is an example of a display 1000 that key user might access to adapt a user interface according to some embodiments. In particular, input fields

1010 might let the key user define the appropriate business context, field type, default value, field label, tool tip, and/or an indication as to whether or not the new field is mandatory.

Figure 11:
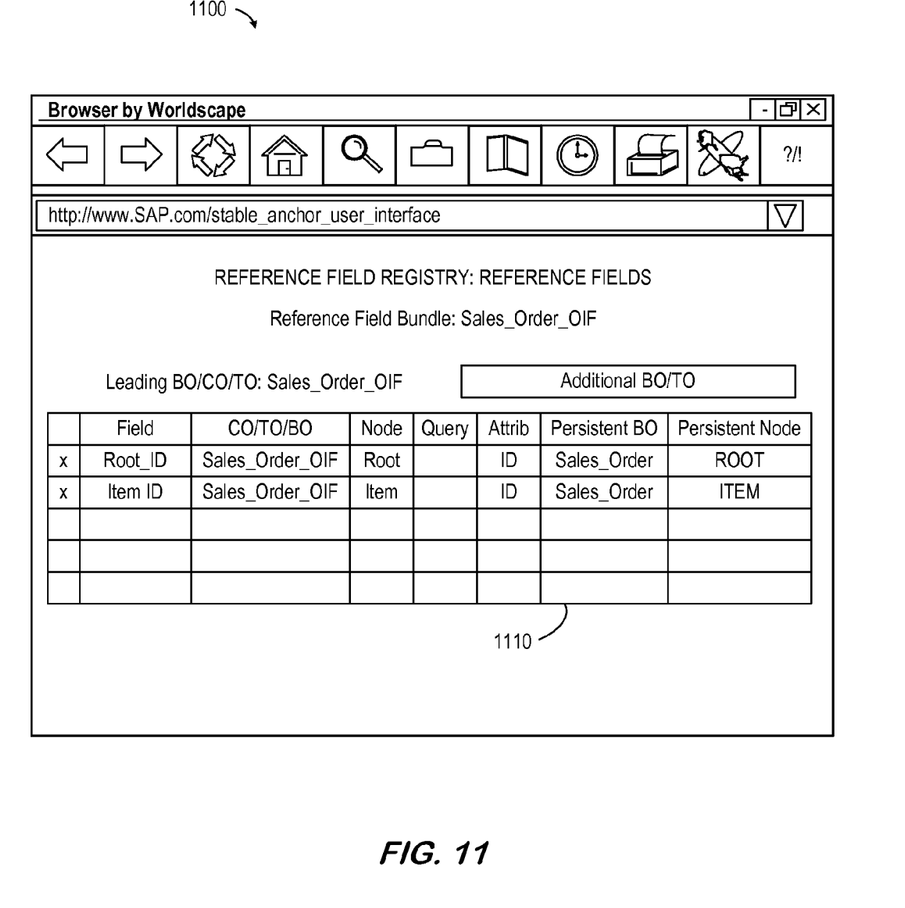
FIG. 11 is an example of a reference field display according to some embodiments.
Figure 12:
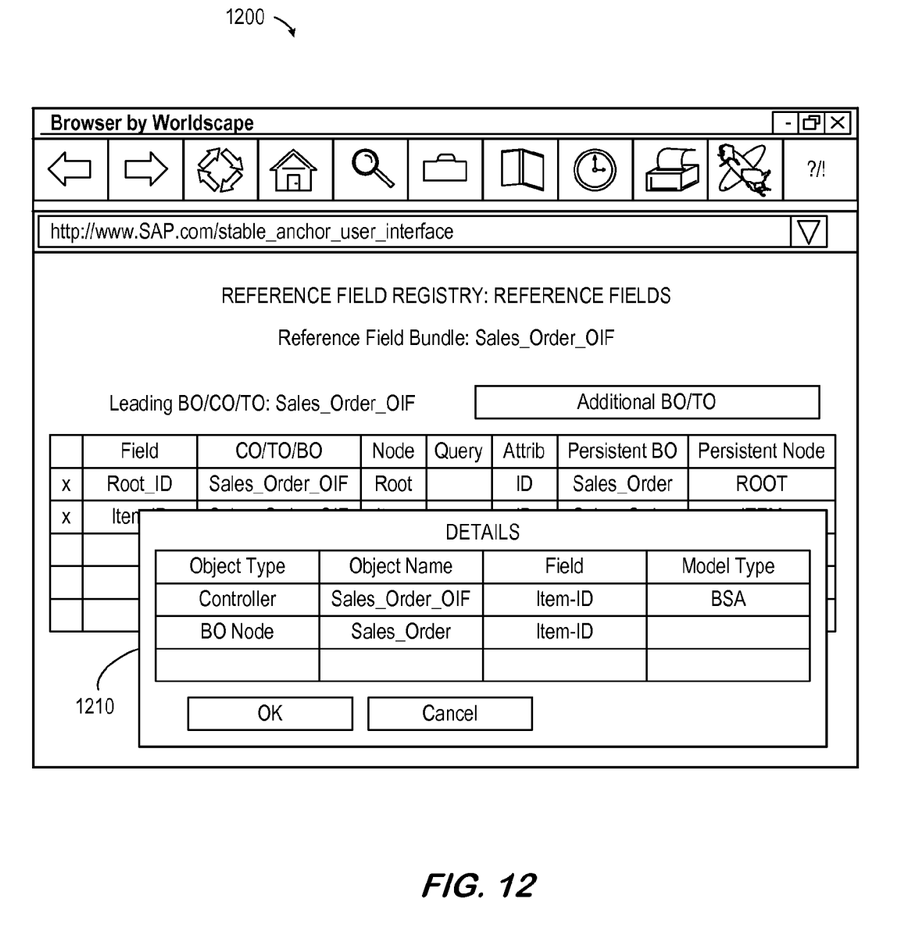
FIG. 12 is an example of a reference field display including a detailed pop-up portion according to some embodiments.

Displays may also be provided to let a business service provider define and/or adjust anchor entities. FIG. 11 is an example of a reference field display 1100 according to some embodiments that shows the set of reference fields maintained for a user interface. The user might simply mark a checkbox in a display area 1110, and the system may propose a name for this reference field. Note that only very few reference fields might need to be maintained (e.g., one for header and one for item). Moreover, according to some embodiments a detailed pop-up may display how the path to the persistent business object node was determined (e.g., via a BSA model). FIG. 12 is an example of a reference field display including such a detailed pop-up 1210 portion according to some embodiments.

In this way, a business service provider may define a set of stable anchors for user interfaces. Clients may then use those stable user anchors when customizing or creating user interfaces. If the business service provider later issues a change package or upgrade, the client's user interface will still be functional (because the change package or upgrade will not have substantially changed the stable anchors).

The embodiments described herein are solely for the purpose of illustration. Those in the art will recognize other embodiments may be practiced with modifications and alterations limited only by the claims.

What is claimed is:

1. A computer implemented method, comprising:
   defining, by a business service provider, a stable user interface anchor entity associated with a business object data structure of a user interface, the user interface comprising a plurality of section groups, each section group comprising a plurality of fields;
   associating a reference field with the stable user interface anchor entity, the reference field comprising one of the plurality of fields and representing a path to a persistent node that encapsulates related data and methods of the business object data structure where the stable user interface anchor entity ensures positioning of the reference field into a correct one of the plurality of section groups;
   applying an end user adaptation to the user interface in connection with the business object data structure, the adaptation referencing the stable user interface anchor entity;
   receiving from a developer a change that alters the stable user interface anchor entity by attempting to move the correct one of the plurality of section groups; and
   preventing the developer from making the change.

2. The method of claim 1, further comprising:
   associating the stable user interface anchor entity with an anchor name representing a position in the user interface, wherein the anchor name is independent of a technical name of a user interface model.

3. The method of claim 1, further comprising:
   receiving from a key user an indication of a desired end user adaptation addition, the addition being associated with a plurality of potential business contexts; and
   requesting that the key user select one of the potential business contexts to be associated with the addition.

4. The method of claim 1, further comprising:
   providing an indication to the developer that the stable user interface anchor entity will be changed.

5. The method of claim 1, wherein the stable user interface anchor entity is associated with at least one of: (i) a front end service adaptation, (ii) a controller object implementation, (iii) a business service architecture, (iv) an advanced business application programming platform, (v) a dynamic dictionary, (vi) manual coding, (vii) a fast search infrastructure, (viii) a transformed object, or (ix) a transformation node.

6. The method of claim 1, further comprising:
   displaying a graphical indication of the stable user interface anchor entity on a user interface.

7. The method of claim 1, wherein the stable user interface anchor entity is defined by a single entity.

8. The method of claim 7, wherein the single entity points to all of: (i) a specific location on the user interface, (ii) a field in the data model of the user interface, and (iii) an underlying, persistent business object.

9. The method of claim 1, wherein the stable user interface anchor entity is defined by: (i) a reference field entity provided in an advanced business application programming backend and (ii) a separate stable user interface anchor element.

10. The method of claim 9, wherein the reference field points to all of: (i) a field in the access mechanism, (ii) a persistent business object node of the business object.

11. The method of claim 9, wherein the stable user interface anchor element points to all of: (i) a specific location on the user interface, (ii) a field in the data model of the user interface, and (iii) a reference field in the advanced business application programming backend.

12. The method of claim 1, wherein the stable user interface anchor entity is defined by a system-wide unique identifier and a referenced entity.

13. The method of claim 1, wherein preventing the developer from making the change is based on a backend interacting with a customer layer to determine that the correct one of the plurality of section groups is associated with the reference field.

14. A non-transitory computer-readable medium storing program code executable by a computer to:
    define, by a business service provider, a stable user interface anchor entity associated with a data structure of a user interface, the user interface comprising a plurality of section groups, each section group comprising a plurality of fields;
    associate a reference field with the stable user interface anchor entity, the reference field comprising one of the plurality of fields and representing a path to a persistent entity that encapsulates related data and methods of the data structure where the stable user interface anchor entity ensures positioning of the reference field into a correct one of the plurality of section groups;
    apply an end user adaptation to the user interface in connection with the data structure, the adaptation referencing the stable user interface anchor entity;
    receive from a developer a change that alters the stable user interface anchor entity by attempting to move the correct one of the plurality of section groups; and
    prevent the developer from making the change.

15. The medium of claim 14, wherein the stable user interface anchor entity is associated with at least one of: (i) a persistent business object node, (ii) an extension field, (iii) a section group or list, (iv) a work center view, (v) a work center, (vi) an outport associated with a mashup or navigation, (vii) a port type associated with a mashup or navigation, or (viii) a navigation operation.

16. The medium of claim 14, further storing program code executable by a computer to:
    provide an indication to the developer that the stable user interface anchor entity will be changed.

17. A system, comprising:
a computer; and
a non-transitory computer-readable medium storing program code executable by the computer to:
define, by a business service provider, a stable user interface anchor entity associated with the business object data structure of a user interface, the user interface comprising a plurality of section groups, each section group comprising a plurality of fields;
associate a reference field with the stable user interface anchor entity, the reference field comprising one of the plurality of fields and representing a path to a persistent node that encapsulates related data and methods of the business object data structure where the stable user interface anchor entity ensures positioning of the reference field into a correct one of the plurality of section groups;
apply an end user adaptation to the user interface in connection with the business object data structure, the adaptation referencing the stable user interface anchor entity;
receive from a developer a change that alters the stable user interface anchor entity by attempting to move the correct one of the plurality of section groups; and
prevent the developer from making the change.

18. The system of claim 17, further comprising:
a customer layer to generate the end user adaptation in connection with a key user tool.

19. The system of claim 17, wherein said applying performed by the enterprise service infrastructure backend is associated with an ordered list of change transactions.

* * * * *